United States Patent
Yamaguchi et al.

(10) Patent No.: US 7,196,445 B2
(45) Date of Patent: *Mar. 27, 2007

(54) PERMANENT-MAGNET ROTATING MACHINE

(75) Inventors: Shinichi Yamaguchi, Tokyo (JP); Haruyuki Kometani, Tokyo (JP); Tomohiro Kikuchi, Tokyo (JP); Takashi Miyazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/415,139

(22) Filed: May 2, 2006

(65) Prior Publication Data

US 2006/0192456 A1    Aug. 31, 2006

Related U.S. Application Data

(63) Continuation of application No. 10/681,343, filed on Oct. 9, 2003, now Pat. No. 7,067,948.

(30) Foreign Application Priority Data

Oct. 18, 2002 (JP) ............................. 2002-303944
Nov. 11, 2002 (JP) ............................. 2002-326384

(51) Int. Cl.
*H02K 21/22* (2006.01)
*H02K 21/14* (2006.01)
*H02K 1/14* (2006.01)

(52) U.S. Cl. ................. 310/156.47; 310/216; 310/217; 310/254

(58) Field of Classification Search ................. 310/216, 310/217, 254, 156.43, 156.47
See application file for complete search history.

(56) References Cited

U.S. PATENT DOCUMENTS

| | | | |
|---|---|---|---|
| 5,355,044 A | 10/1994 | Uchida et al. | |
| 5,821,710 A | 10/1998 | Masuzawa et al. | |
| 6,462,452 B2 | 10/2002 | Nakano et al. | |
| 6,657,349 B2 * | 12/2003 | Fukushima | 310/156.47 |
| 6,707,209 B2 | 3/2004 | Crapo et al. | |
| 6,853,105 B2 * | 2/2005 | Nakano et al. | 310/156.47 |
| 7,067,948 B2 * | 6/2006 | Yamaguchi et al. | 310/156.47 |

FOREIGN PATENT DOCUMENTS

| | | |
|---|---|---|
| JP | 61-17876 U | 2/1986 |
| JP | 2-106152 | 4/1990 |

(Continued)

*Primary Examiner*—Tran Nguyen
(74) *Attorney, Agent, or Firm*—Leydig, Voit & Mayer, Ltd.

(57) ABSTRACT

A permanent-magnet rotating machine includes a rotor having a rotor core carrying on a curved outer surface multiple permanent magnets arranged in two rows along an axial direction. The permanent magnets in one row are skewed from those in the other row in a circumferential direction by a row-to-row skew angle (electrical angle) θe. A stator having a tubular stator core in which the rotor disposed, includes stator coils for producing a rotating magnetic field for rotating the rotor. A lower limit of the row-to-row skew angle θe larger than 30 degrees (electrical angle). A ratio, of cogging torque occurring in the absence of skew to cogging torque occurring when the permanent magnets are skewed, at a row-to-row skew angle of 30 degrees is calculated based on the cogging torque ratio, the row-to-row skew angle θe, and B-H curve properties of the stator core. An upper limit of the row-to-row skew angle θe is not larger than the maximum value at which the cogging torque ratio does not exceed the calculated cogging torque ratio at 30 degrees.

10 Claims, 15 Drawing Sheets

FOREIGN PATENT DOCUMENTS

| | | |
|---|---|---|
| JP | 4-21330 | 5/1992 |
| JP | 4-255440 | 9/1992 |
| JP | 8-251847 | 9/1996 |
| JP | 2000-308286 | 11/2000 |
| WO | WO 02/41471 | 5/2002 |

* cited by examiner

PERMANENT-MAGNET ROTATING MACHINE

BACKGROUND OF THE INVENTION

1. Field of the Invention

The present invention relates to a permanent-magnet rotating machine, such as an electric motor, and in particular, to a permanent-magnet rotating machine designed to achieve a reduction in cogging torque.

2. Description of the Background Art

In an ordinary construction of a permanent-magnet rotating machine, a rotor is disposed inside a stator. The stator has a tubular iron core carrying a plurality of stator coils arranged on its curved inner surface to form multiple magnetic poles. The rotor has a rotor core and shaft placed inside the stator so that the rotor can rotate about a central axis of the stator. Permanent magnets are provided on the curved outer surface of the rotor core or embedded in it. The permanent magnets are arranged in such a way that their north (N) and south (S) poles alternate along the surface of the rotor core. The rotating machine causes electric currents to flow through the stator coils to produce a rotating magnetic field so that the rotor rotates about its shaft.

In the rotating machine thus constructed, there occur variations in revolving torque and speed. This phenomenon known as "cogging" causes not only vibrations and noise but also deterioration of controllability of the rotating machine.

Japanese Laid-open Utility Model Publication No. 1986-17876, for example, discloses an arrangement for reducing the cogging torque. According to the Publication, multiple rows of permanent magnets are arranged on a cylindrical surface of a rotor core along its axial direction in a manner that the permanent magnets are offset, or skewed, in the circumferential direction of the rotor core to produce a skewing effect. More specifically, the multiple permanent magnets are skewed in the circumferential direction from one row to next, according to their location along the axial direction of the rotor core, such that the permanent magnets are arranged on the surface of the rotor core at a skew angle (hereinafter referred to as the row-to-row skew angle) $\theta m$.

Conventionally, a theoretically determined angle (hereinafter referred to as the theoretical angle) is used as the row-to-row skew angle (physical angle) $\square m$. The theoretical angle at which the cogging torque is expected to be minimized is calculated as 360/(the smallest number of which the number of stator poles and the number of rotor poles are factors)/(the number of permanent magnet rows along the axial direction) as discussed in Japanese Laid-open Patent Publication No. 2000-308286, for example.

As an example, if the number of stator poles of a rotating machine is 12, the number of rotor poles is 8, and the number of permanent magnet rows along the axial direction is 4, and it is intended to reduce the cogging torque individually by the upper two rows and lower two rows of permanent magnets, the row-to-row skew angle $\theta m$ of the upper two rows, and of the lower two rows, is 7.5 degrees (=360/24/2, which is not 30 degrees in electrical angle $\theta e$).

Japanese Patent Publication No. 2672178 and Japanese Laid-open Patent Publication No. 1996-251847, for example, disclose another arrangement for reducing the cogging torque. Specifically, the number of permanent magnet rows is set to 2n, where n is an integer equal to 2 or larger, or permanent magnets are attached in nonuniform positions.

Even if the theoretically determined row-to-row skew angle $\theta m$ is applied to an actual rotating machine, however, it is considered still insufficient for reducing the cogging torque. This is because the influence of magnetic saturation due to magnet flux leakage, which is caused by the aforementioned skewed magnet row arrangement, is not taken into consideration. While a leakage flux that causes the cogging torque could occur at joints between the permanent magnet rows and on the interior of the rotor core, for instance, a leakage flux occurring inside the stator core is a major cause of the cogging torque.

As stated above, the conventional skewed magnet row arrangement used in the rotating machine is associated with the problem that the cogging torque can not be reduced sufficiently since the theoretically determined skew angle is used the row-to-row skew angle.

SUMMARY OF THE INVENTION

This invention has been made to provide a solution to the aforementioned problem of the prior art. Specifically, it is an object of the invention to provide a permanent-magnet rotating machine which can efficiently reduce cogging torque and torque ripples compared to a case where permanent magnets are skewed by a theoretically determined row-to-row skew angle.

According to the invention, a permanent-magnet rotating machine includes a rotor having a rotor core carrying on its curved outer surface multiple permanent magnets which are arranged in two rows along an axial direction in such a manner that the permanent magnets in one row are skewed from the permanent magnets in the other row in a circumferential direction by a row-to-row skew angle $\theta e$ expressed in terms of an electrical angle, and a stator having a cylindrical stator core in which the rotor is disposed, the stator core being provided with stator coils for producing a rotating magnetic field which causes the rotor to rotate. In this permanent-magnet rotating machine, a lower limit of the row-to-row skew angle $\theta e$ is set at a value larger than a theoretical angle $\theta s$ expressed in terms of the electrical angle given by 180 times the number of rotor poles/the least common multiple of the number of stator poles and the number of rotor poles)/(the number of permanent magnet rows along the axial direction). A cogging torque ratio, which is the ratio of a cogging torque occurring in the absence of skew to a cogging torque occurring when the permanent magnets are skewed, at the theoretical angle $\theta s$ is calculated based on the relationship between the cogging torque ratio and the row-to-row skew angle $\theta e$ and properties concerning the relationship between flux density and magnetizing force of the stator core, and an upper limit of the row-to-row skew angle $\theta e$ is set at a value equal to or smaller than a maximum value of the row-to-row skew angle $\theta e$ at which the cogging torque ratio does not exceed the calculated cogging torque ratio at the theoretical angle $\theta s$.

These and other objects, features and advantages of the invention will become more apparent upon reading the following detailed description along with the accompanying drawings.

DETAILED DESCRIPTION OF THE PREFERRED EMBODIMENTS OF THE INVENTION

Figure 1:
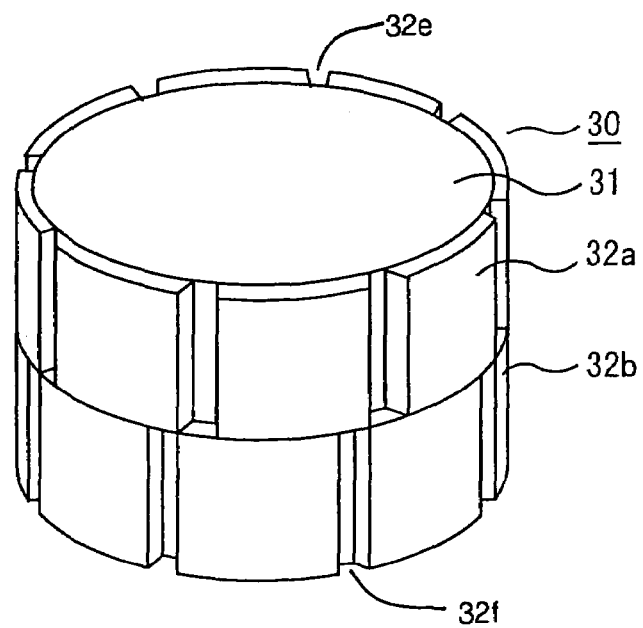
FIG. 1 is a perspective view of a rotor of a permanent-magnet rotating machine according to a first embodiment of the invention.
Figure 2A:
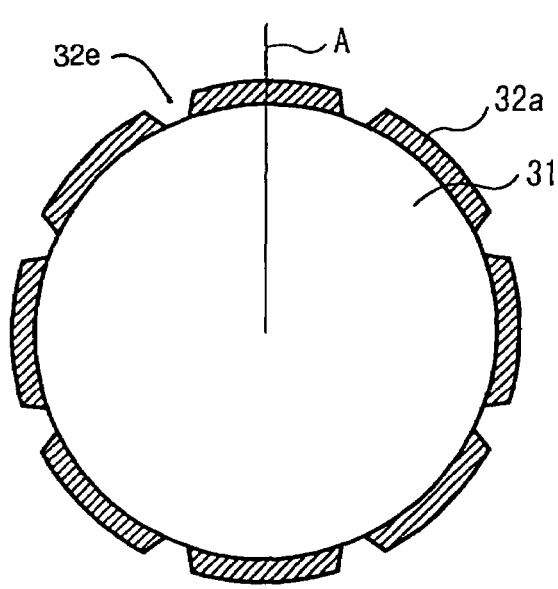
FIGS. 2A and 2B are sectional plan views of the rotor of FIG. 1.
Figure 2B:
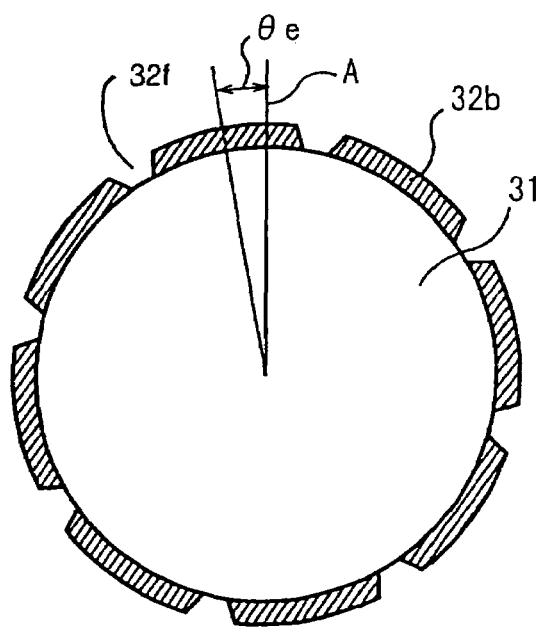
Figure 3:
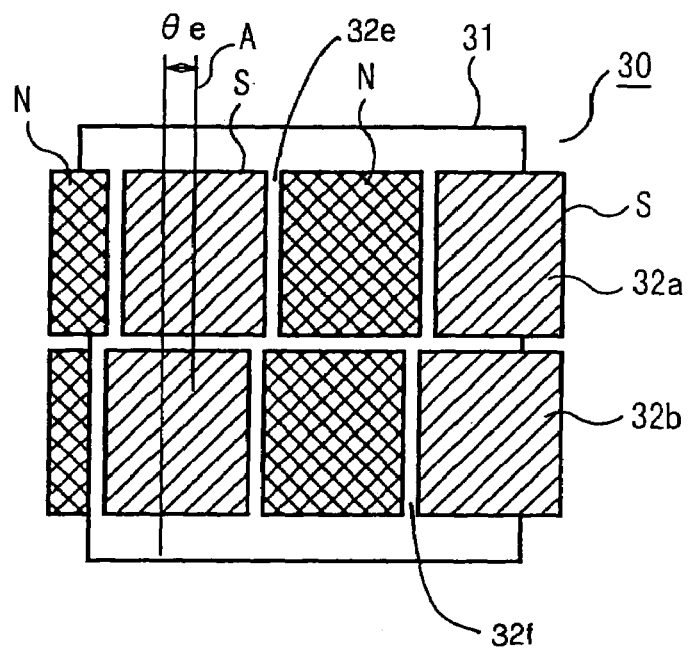
FIG. 3 is a side view of the rotor of FIG. 1.

Preferred embodiments of the invention will now be described, by way of example, with reference to the accompanying drawings.

First Embodiment

FIGS. 1, 2A, 2B, 3 and 4 are diagrams showing the construction of a permanent-magnet rotating machine according to a first embodiment of the invention, in which FIGS. 1, 2A, 2B and 3 particularly show the arrangement of permanent magnets 32a, 32b on a rotor 30.

Referring to FIGS. 1, 2A, 2B and 3, the rotor 30 includes a rotor core 31 and the aforementioned permanent magnets 32a, 32b attached to a curved outer surface of the rotor core 31. The permanent magnets 32a and the permanent magnets 32b are disposed in an upper row and a lower row, respectively, in such a manner that N and S poles are alternately arranged in each row along the circumference of the rotor core 31. Respective gaps 32e and 32f on the circumference of the rotor core 31 separate adjacent pairs of the poles of the magnets 32a and 32b. respectively. The permanent magnets 32a in the upper row and the permanent magnets 32b in the lower row are offset, or skewed, in the circumferential direction of the rotor core 31 by a row-to-row skew angle (electrical angle) θe. As can be seen from the Figures, the number of magnetic poles of the rotor 30 is 8 and the number of permanent magnet rows is 2 in this embodiment.

Figure 4:
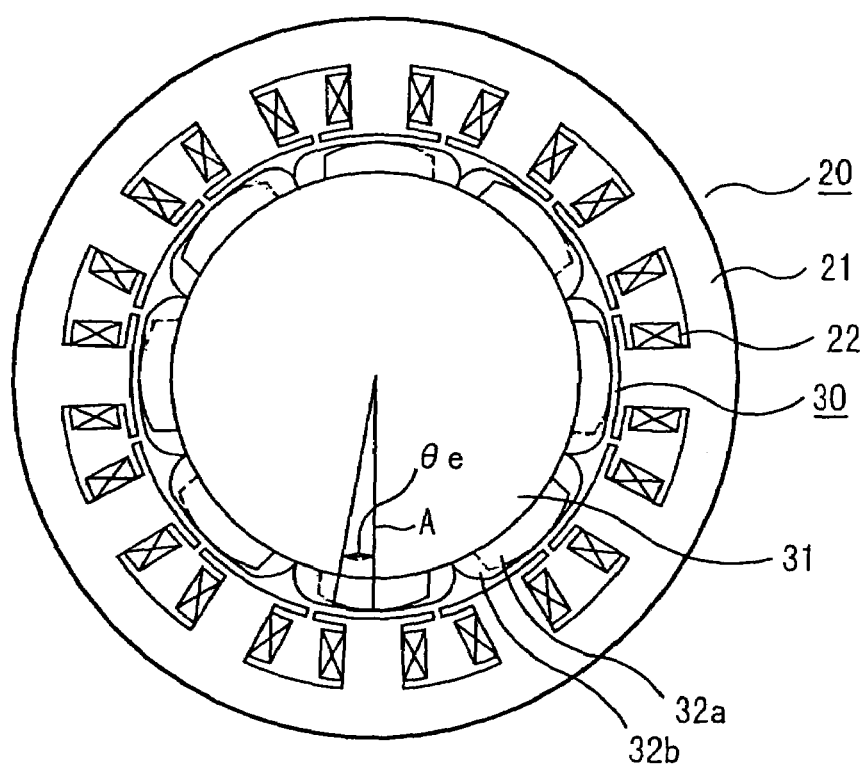
FIG. 4 is a sectional plan view of the permanent-magnet rotating machine of the first embodiment.

As shown in FIG. 4, a stator 20 includes a cylindrical stator core 21 and a plurality of stator coils 22 which are arranged on a curved inner surface of the stator core 21 to form multiple magnetic poles. The rotor core 31 of the rotor 30 is mounted inside the stator 20 so that the rotor 30 can rotate about a central axis of the stator 20. Electric currents are caused to flow through the stator coils 22 in a controlled fashion to create a rotating magnetic field so that the rotor 30 rotates about its rotary shaft which is aligned with the central axis of the stator 20.

As shown in FIGS. 2A, 2B, 3 and 4, the permanent magnets 32b in the lower row are offset by an electrical angle of 36 degrees in the circumferential direction of the rotor core 31 with respect to a reference line A of the permanent magnets 32a in the upper row. This offset electrical angle, or the row-to-row skew angle θe, is made larger than a theoretical angle θs (30 degrees) determined by (180 times the number of rotor poles/the least common multiple of the number of stator poles and the number of rotor poles)/(the number of permanent magnet rows along the axial direction=2).

Since the row-to-row skew angle θe is made larger than the theoretical angle θs but not larger than a maximum value of the row-to-row skew angle θe that is determined according to magnetic properties of the stator core 21 and the rotor core 31 as will be discussed later, it is possible to efficiently reduce cogging torque and torque ripples, compared to a case where the theoretical angle θs is used as the row-to-row skew angle θe. The following discussion illustrate show the cogging torque and torque ripples are related with the row-to-row skew angle θe and how the cogging torque and torque ripples are reduced according to the present embodiment.

Figure 5:
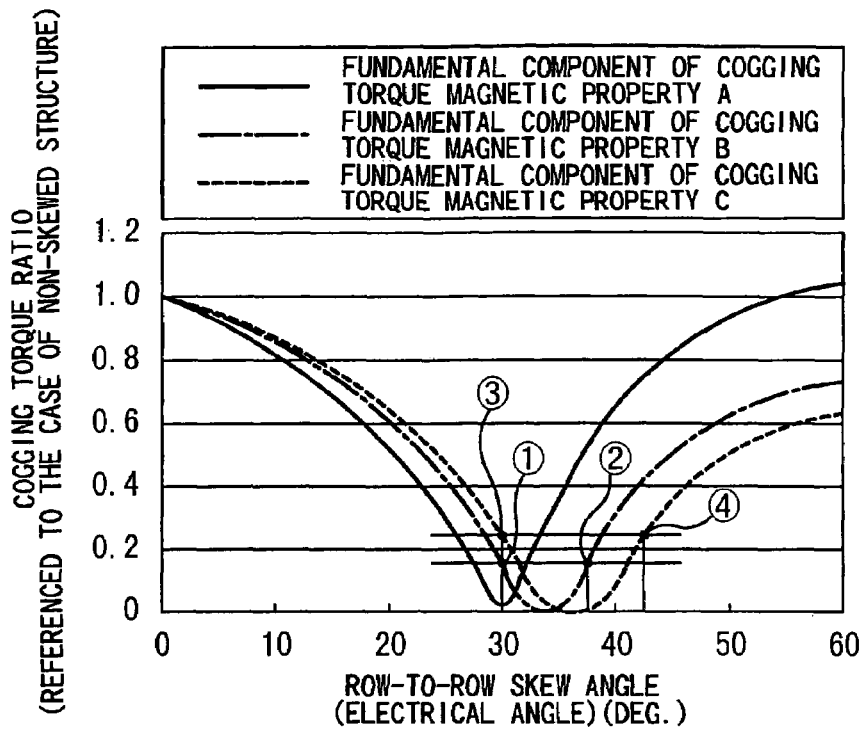
FIG. 5 is a chart showing fundamental components of cogging torque obtained from a three-dimensional magnetic field analysis carried out on the rotor and the permanent-magnet rotating machine of FIGS. 1 through 4.
Figure 6:
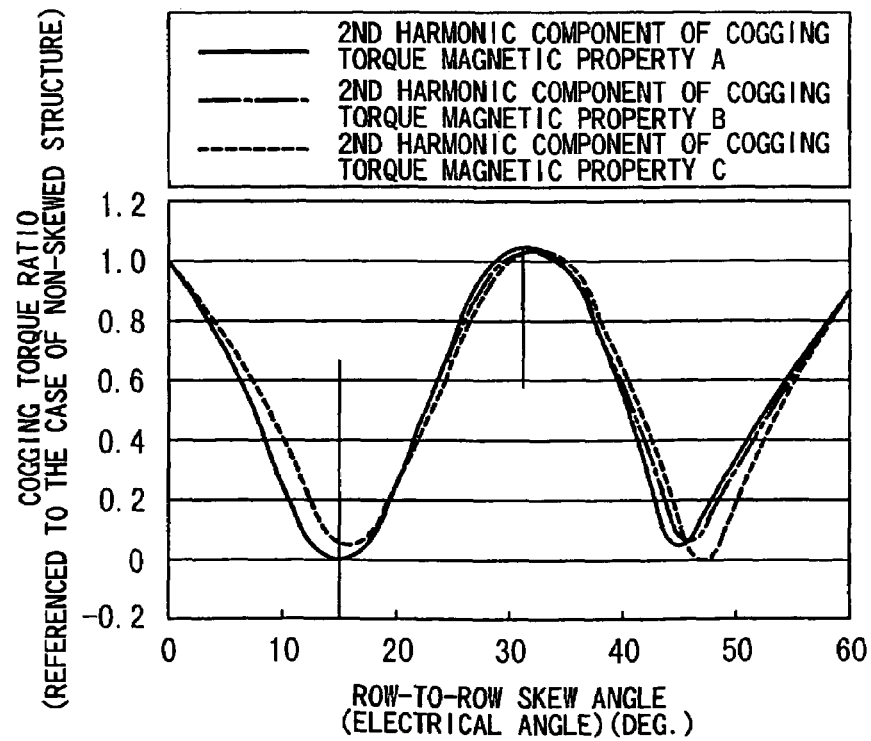
FIG. 6 is a chart showing second harmonic components of the cogging torque obtained from the three-dimensional magnetic field analysis carried out on the rotor and the permanent-magnet rotating machine of FIGS. 1 through 4.

FIGS. 5 and 6 show results of a three-dimensional magnetic field analysis carried out on the rotor 30 and the permanent-magnet rotating machine (in which the number of rotor poles is 8, the number of stator poles is 12 and the number of permanent magnet rows is 2) shown in FIGS. 1 through 4.

FIG. 5 is a chart showing the result of an analysis of fundamental components of the cogging torque, and FIG. 6 is a chart showing the result of an analysis of second harmonic components of the cogging torque. FIGS. 5 and 6 individually show the relationship between a cogging torque ratio, which is the ratio of the cogging torque occurring in the absence of skew to the cogging torque occurring when the permanent magnets 32a, 32b are skewed, and the row-to-row skew angle (electrical angle) θe in three different cases, that is, the case where the stator 20 has an ideal magnetic property (magnetic property A), the case where the magnetic property of the stator 20 has somewhat deteriorated during its manufacturing process (magnetic property B), and the case where the magnetic property of the stator 20 has further deteriorated in the manufacturing process (magnetic property C).

Figure 7:
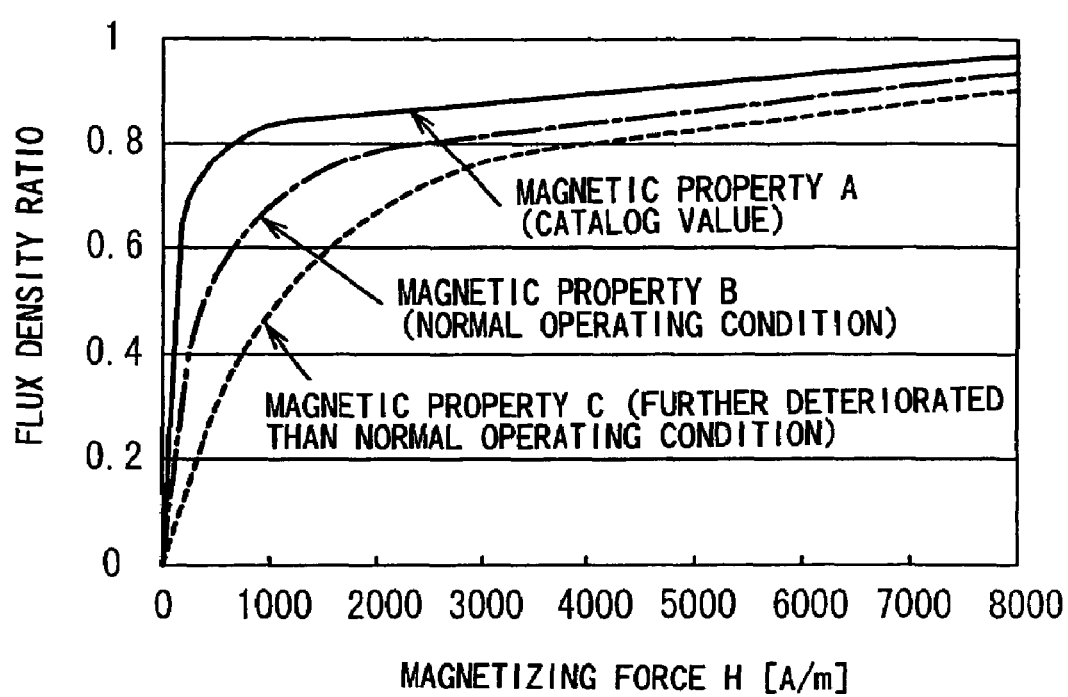
FIG. 7 is a chart showing magnetic properties of a rotor core used in the three-dimensional magnetic field analysis.

FIG. 7 is a chart showing the magnetic properties A, B, C (B-H curves representing the relationship between flux density ratio and magnetizing force H) of the stator core 21 used in the analysis. The flux density ratio of FIG. 7 means the ratio of flux density to the saturation flux density of a material having the ideal magnetic property A. The magnetic property A is a property corresponding to a catalog value unaffected by the manufacturing, or machining, process, whereas the magnetic property B is a property observed in an actual rotating machine under normal operating conditions in which the flux density ratio of the stator core 21 has decreased by approximately 20% at a magnetizing force H of about 1000 A/m, as compared to the magnetic property A. Also, the magnetic property C corresponds to the property of the stator core 21 of which flux density ratio has decreased by approximately 40% at the magnetizing force H of about 1000 A/m, as compared to the magnetic property A.

It is recognized from FIG. 5 that the row-to-row skew angle θe at which the cogging torque ratio is minimized progressively increases as the magnetic property of the stator core 21 deteriorates, in the order of magnetic properties A, B and C, with respect to the fundamental component of the cogging torque. This is because a leakage flux occurs inside the stator core 21 in its axial direction as stated earlier when the skewed magnet row arrangement is employed. Specifically, the row-to-row skew angle θe at which the cogging torque is minimized becomes larger than the theoretical angle θs of 30 degrees as the magnetic property of the stator core 21 deteriorates. When the row-to-row skew angle θe is set at the theoretical angle θs of 30 degrees in the rotating machine of the magnetic property B, the cogging torque ratio at point (1) of FIG. 5 is approximately 0.18 for the fundamental component. By comparison, when the row-to-row skew angle θe is set at a value larger than the theoretical angle θs of 30 degrees but not larger than a row-to-row skew angle of approximately 37 degrees at point (2) beyond which the cogging torque ratio exceeds 0.18 obtained at point (1), the fundamental component of the cogging torque becomes equal to or lower than a level observed at the theoretical angle θs (30 degrees). Similarly, in the rotating machine of the magnetic property C, when the row-to-row skew angle θe is set at a value larger than the theoretical angle θs (30 degrees) but not larger than a row-to-row skew angle of approximately 43 degrees at point (4) beyond which the cogging torque ratio exceeds the value of approximately 0.23 obtained at point (3), the fundamental component of the cogging torque becomes equal to or lower than a level observed at the theoretical angle θs (30 degrees).

The above discussion has illustrated a case where the ratio of the number of rotor poles to the number of stator poles is 2:3 with reference to FIG. 5. It is apparent from the foregoing that, for a given ratio of the number of rotor poles to the number of stator poles of the actual rotating machine, the fundamental component of the cogging torque can be made equal to or lower than a level observed when the row-to-row skew angle θe is set at the theoretical angle θs by setting a lower limit of the row-to-row skew angle θe at a value larger than the theoretical angle θs, and setting an upper limit of the row-to-row skew angle θe at a value equal to or smaller than a maximum value of the row-to-row skew angle θe at which the cogging torque ratio does not exceed the cogging torque ratio at the theoretical angle θs determined based on the relationship between the cogging torque ratio and the row-to-row skew angle θe and the magnetic property (B-H curves) of the stator core 21.

It is further recognized from FIG. 6 that the second harmonic component of the cogging torque is minimized at a row-to-row skew angle of one-half or one and one-half times the theoretical angle θs (30 degrees), or at an electrical angle of 15 or 45 degrees, respectively. Since the second harmonic component of the cogging torque is not susceptible to the leakage flux in the axial direction (or the effect of magnetic saturation), the second harmonic component of the cogging torque is supposed to be well suppressed by setting the row-to-row skew angle θe at one-half or one and one-half times the theoretical angle θs (30 degrees).

On the other hand, the relationship between the row-to-row skew angle and torque ripples is usually analyzed by using a winding factor known as a skew factor. The skew factor Ksv for a vth harmonic component of the cogging torque is given by equation (2) below:

$$Ksv=\sin(vY/2)/(vY/2) \qquad (2)$$

where Y is the skew angle.

Expressing the row-to-row skew angle as Yd, Yd=Y/2, so that the skew factor Kdsv expressed by the row-to-row skew angle Yd is given by equation (3) below:

$$Kdsv=\sin(vYd)/(vYd) \qquad (3)$$

Among the torque ripples occurring in a permanent-magnet rotating machine, a torque ripple component having a frequency 6 times the power supply frequency is most predominant. Generally, this torque ripple component (hereinafter referred to as the 6f component) is caused by fifth and seventh harmonics of the cogging torque.

Figure 8:
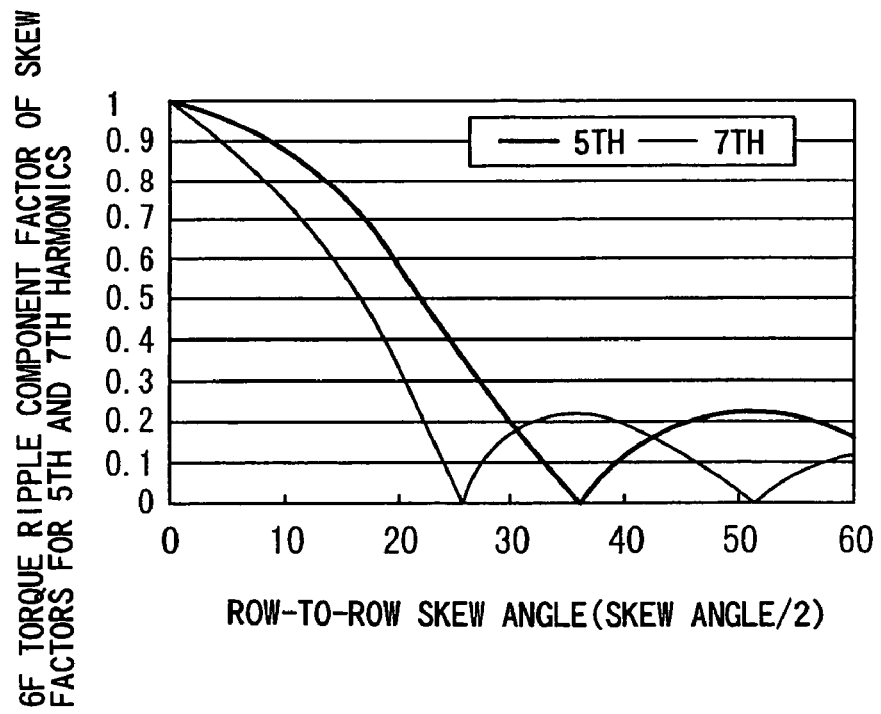
FIG. 8 is a chart showing skew factors for the fifth and seventh harmonics versus the row-to-row skew angle.

FIG. 8 is a chart showing skew factors for the fifth and seventh harmonics versus the row-to-row skew angle Yd calculated from the aforementioned equation (2). The extent of the influence of the fifth and seventh harmonics on the 6f component of the torque ripple is supposed to be approximately related to the reciprocal of the square of the order of each harmonic component. Thus, the extent of the influence of the fifth harmonic on the 6f component is supposed to be $\frac{1}{5}^2=0.04$, and the extent of the influence of the seventh harmonic is supposed to be $\frac{1}{7}^2=0.02$.

Figure 9:
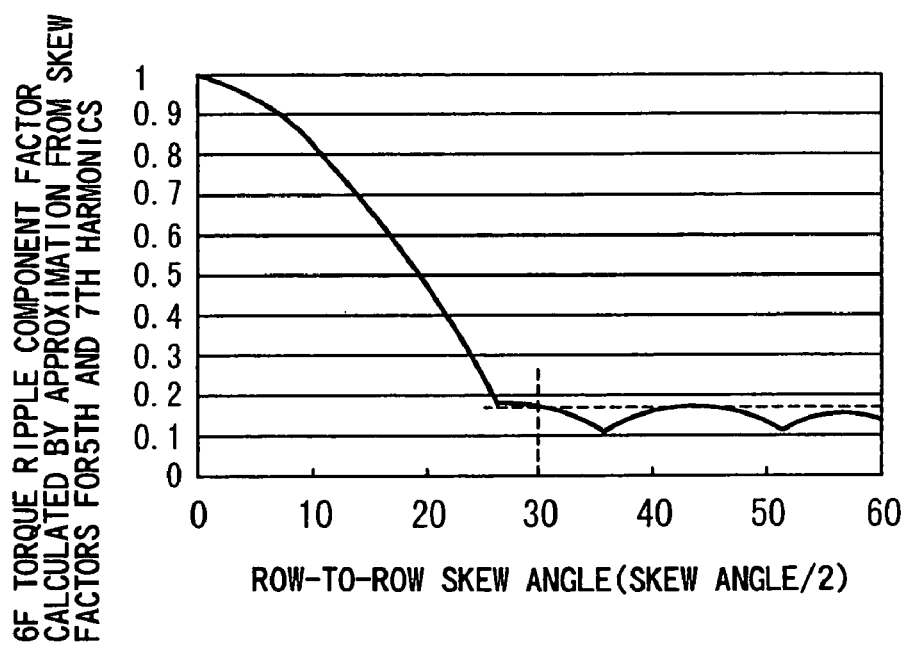
FIG. 9 is a chart showing 6f torque ripple component factors versus the row-to-row skew angle.

FIG. 9 is a chart showing 6f torque ripple component factors versus the row-to-row skew angle Yd obtained taking into consideration the skew factor and the extent of the influence of the fifth and seventh harmonics on the 6f component of the torque ripple of FIG. 8. It can be seen from FIG. 9 that when the row-to-row skew angle Yd exceeds 30 degrees, the 6f torque ripple component factor becomes smaller than its value at the row-to-row skew angle Yd of 30 degrees. Therefore, it is considered possible to reduce the 6f torque ripple component factor by setting the row-to-row skew angle Yd at an angle equal to or greater than 30 degrees which is the theoretical angle θs for the fundamental component of the cogging torque.

Second Embodiment

Figure 10:
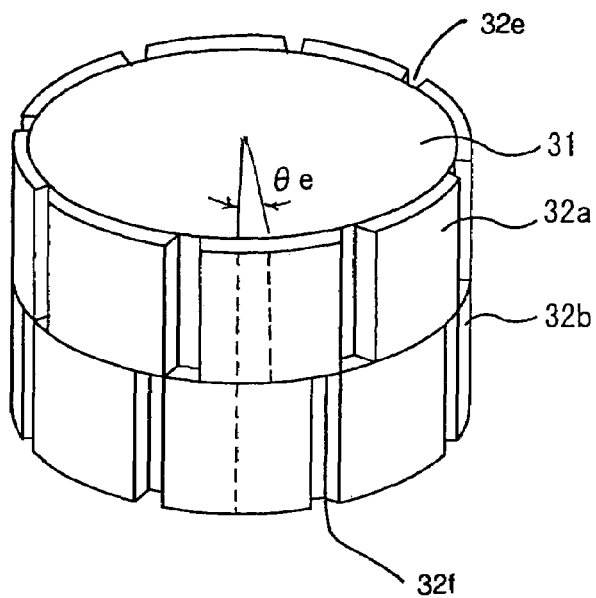
FIG. 10 is a perspective view of a rotor of a permanent-magnet rotating machine according to a second embodiment of the invention.
Figure 11:
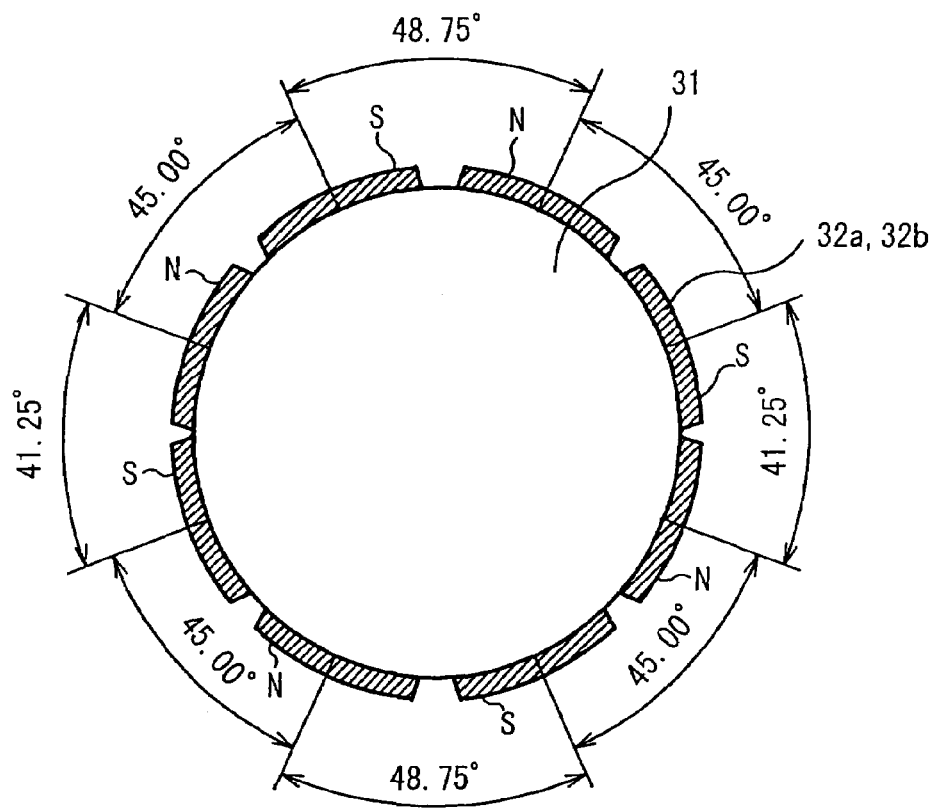
FIG. 11 is a sectional plan view of the rotor of FIG. 10.

FIG. 10 is a perspective view of a rotor core 31 of a permanent-magnet rotating machine according to a second embodiment of the invention, and FIG. 11 is a sectional view of the rotor core 31 of FIG. 10 as viewed along its axial direction, in which elements identical or similar to those shown in FIGS. 1 through 4 are designated by the same reference numerals.

As shown in FIG. 10, permanent magnets 32a and permanent magnets 32b are arranged in upper and lower rows, respectively, with a row-to-row skew angle θe in the same fashion as so far discussed with reference to the first embodiment.

The permanent magnets 32a, 32b in the upper and lower rows are attached to the rotor core 31 in such a manner that their N and S poles are skewed as shown in FIG. 11. Specifically, the permanent magnets 32a, 32b are arranged such that the electrical angle between the N and S poles of successive pole pairs in each row is made alternately smaller and larger than normal by as much as 15 degrees (3.75 degrees in mechanical angle) by offsetting the permanent magnets 32a, 32b from equiangular points around the circumference of the rotor core 31. More specifically, two permanent magnets 32a forming one N-S pole pair are offset from the equiangular points by as much as 15 degrees (3.75 degrees in mechanical angle) so that they are located closer to each other, and two permanent magnets 32a forming the adjacent N-S pole pair are offset from the equiangular points by as much as 15 degrees (3.75 degrees in mechanical angle) so that they are located farther away from each other. Likewise, two permanent magnets 32b forming one N-S pole pair are offset from the equiangular points by as much as 15 degrees (3.75 degrees in mechanical angle) so that they are located closer to each other, and two permanent magnets 32b forming the adjacent N-S pole pair are offset from the equiangular points by as much as 15 degrees (3.75 degrees in mechanical angle) so that they are located farther away from each other.

According to this embodiment, it is possible to reduce the fundamental component of the cogging torque by the row-to-row skew angle $\theta e$ between the permanent magnets 32a in the upper row and the permanent magnets 32b in the lower row. Additionally, it is possible to reduce the second harmonic component of the cogging torque since the permanent magnets 32a, 32b in the upper and lower rows are attached to the rotor core 31 in such a manner that the electrical angle between the N and S poles of successive pole pairs in each row is alternately decreased and increased by arranging the permanent magnets 32a, 32b forming each N-S pole pair alternately closer to and farther away from each other by as much as 15 degrees with respect to the equiangular points.

It is apparent from the foregoing discussion that the electrical angle by which the permanent magnets 32a, 32b should be offset from the equiangular points is one-half times the theoretical angle $\theta s$.

Third Embodiment

Figure 12:
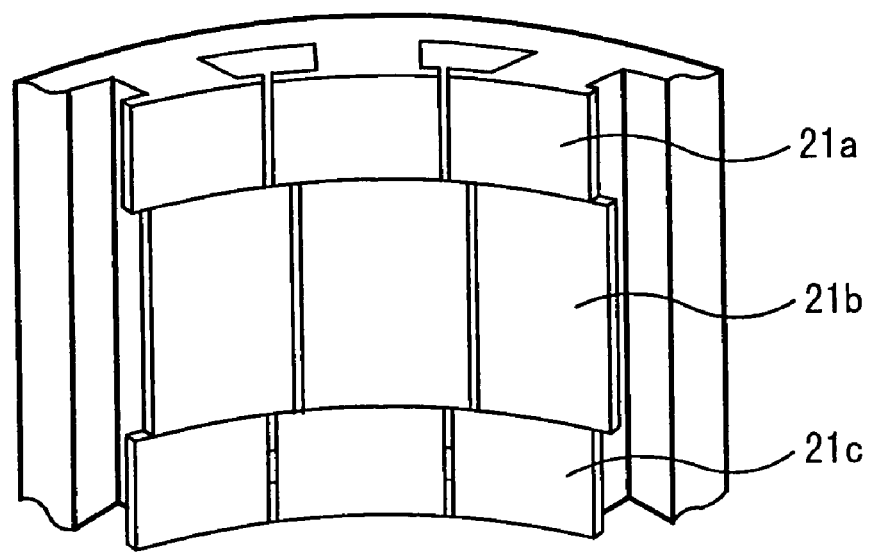
FIG. 12 is a fragmentary perspective view of a multi-block stator according to a third embodiment of the invention.
Figure 13:
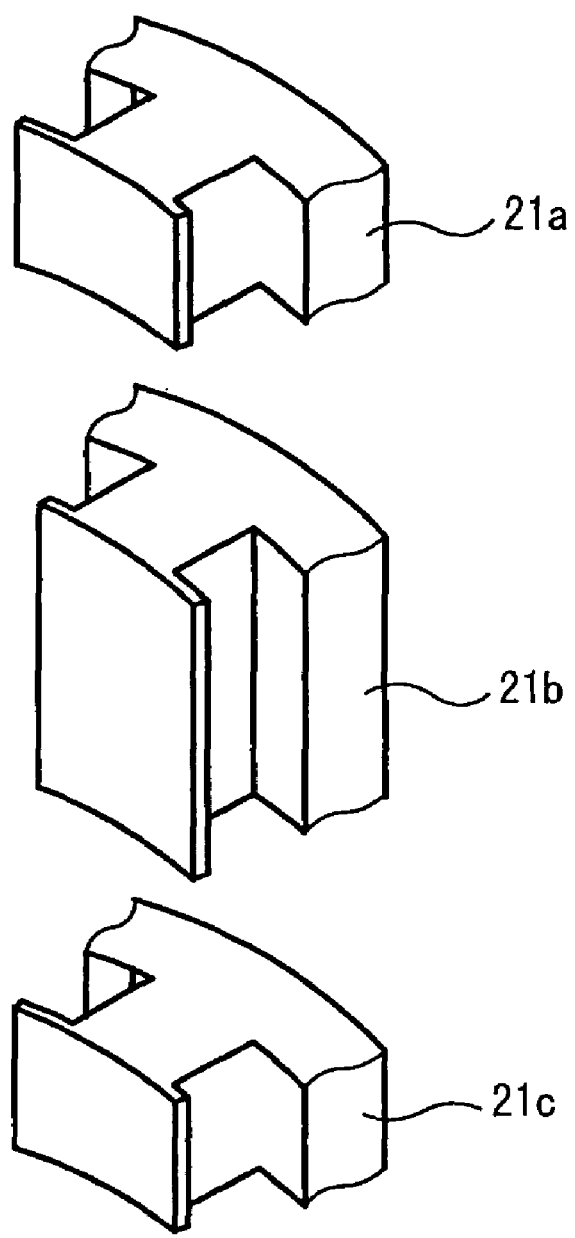
FIG. 13 is a fragmentary perspective view showing a multi-block structure of the stator of the third embodiment.
Figure 14:
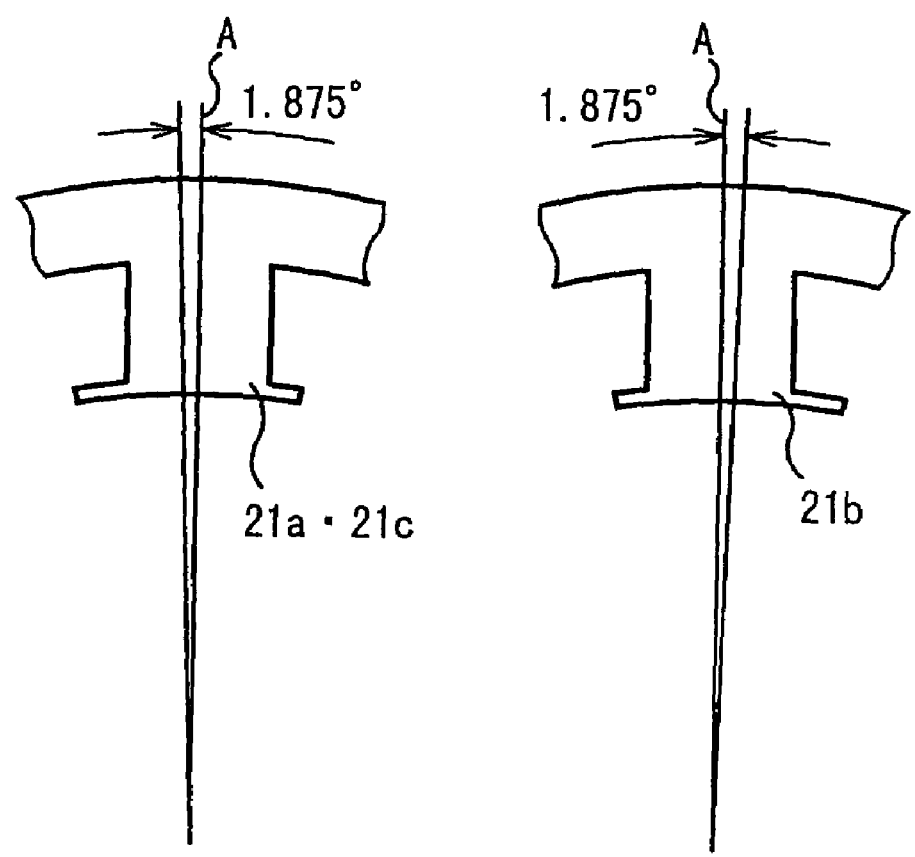
FIG. 14 is a fragmentary sectional plan view of each block of the stator of the third embodiment.

FIG. 12 is a fragmentary perspective view of a stator according to a third embodiment of the invention, FIG. 13 is a fragmentary perspective view showing a multi-block structure of the stator of the third embodiment, and FIG. 14 is a fragmentary sectional plan view of each block of the stator of the third embodiment.

This embodiment employs the same structure as the first embodiment in that a lower limit of the row-to-row skew angle $\theta e$ is set at a value larger than the theoretical angle $\theta s$ and an upper limit of the row-to-row skew angle $\theta e$ is set at a value equal to or smaller than a maximum value of the row-to-row skew angle $\theta e$ at which the cogging torque ratio does not exceed the cogging torque ratio at the theoretical angle $\theta s$ determined based on the relationship between the cogging torque ratio and the row-to-row skew angle $\theta e$ and the magnetic property (B-H curves) of the stator core 21.

The structure of the third embodiment differs from that of the first embodiment in that the stator core is divided into an upper block 21a, a middle block 21b and a lower block 21c and these blocks 21a, 21b, 21c are offset in mutually opposite directions circumferentially from one row to next to achieve row-to-row skewing as shown in FIGS. 12 and 13. Specifically, the upper and lower blocks 21a, 21c are offset from a reference line A in a direction opposite to the direction in which the middle block 21b is offset from the reference line A as shown in FIG. 14, wherein the row-to-row skew angle $\theta e$ is made equal to a theoretical angle given as one-half the theoretical angle $\theta s$ at which the fundamental component of the cogging torque is theoretically expected to be minimized.

FIG. 14 illustrates a case where the ratio of the number of rotor poles to the number of stator poles is 2:3. It is possible to reduce the second harmonic component of the cogging torque by setting the row-to-row skew angle $\theta e$ at an electrical angle of 15 degrees (3.75 degrees in mechanical angle) as depicted in this Figure. In this embodiment, the height of the upper block 21a and the lower block 21c is made equal to half the height of the middle block 21b.

Fourth Embodiment

FIGS. 15, 16A, 16B, 16C, 16D and 17 are diagrams showing the construction of a permanent-magnet rotating machine according to a fourth embodiment of the invention, in which elements identical or similar to those shown in the foregoing embodiments are designated by the same reference numerals.

Figure 15:
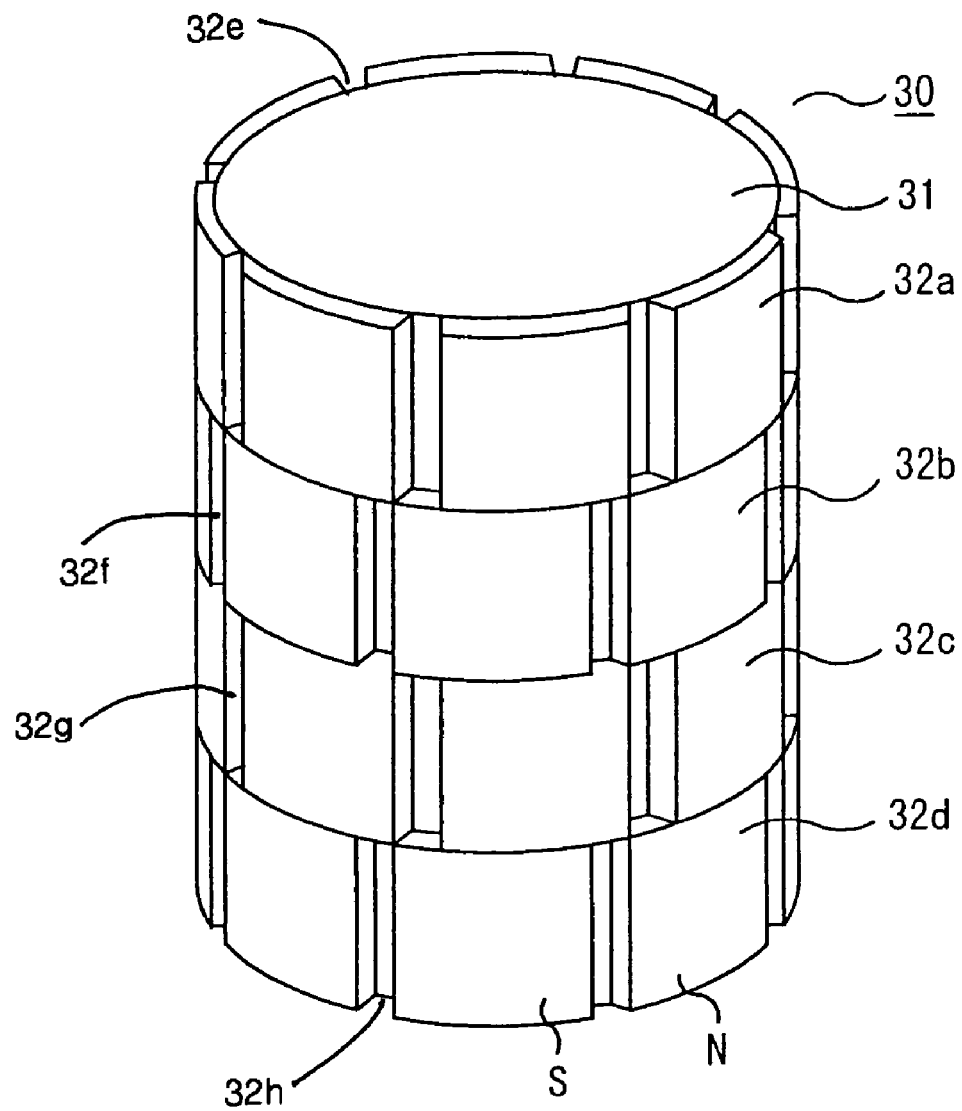
FIG. 15 is a perspective view of a rotor of a permanent-magnet rotating machine according to a fourth embodiment of the invention.

As shown in FIG. 15, a rotor 30 includes a rotor core 31 and four rows of permanent magnets 32a, 32b, 32c, 32d attached to a curved outer surface of the rotor core 31 in such a manner that N and S poles are alternately arranged along the circumference of the rotor core 31 in each row. Each row of magnets includes corresponding gaps 32e, 32f, 32g, and 32h, between adjacent pairs of the poles of the magnets 32a, 32b, 32c, and 32d, respectively. These permanent magnets 32a, 32b, 32c, 32d are disposed in consideration of a row-to-row skew angle between the permanent magnets 32a and 32b in the upper two (first and second) rows and between the permanent magnets 32c, 32d in the lower two (third and fourth) rows, as well as a row-to-row skew angle between the upper two magnet rows and the lower two magnet rows.

Figure 16A:
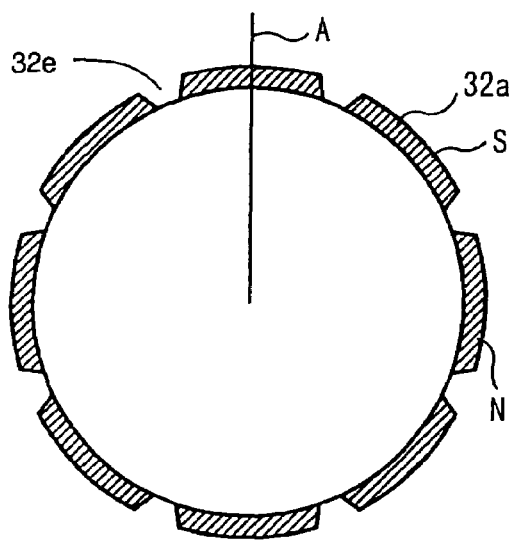
FIGS. 16A, 16B, 16C and 16D are sectional plan views of the rotor of FIG. 15.
Figure 16B:
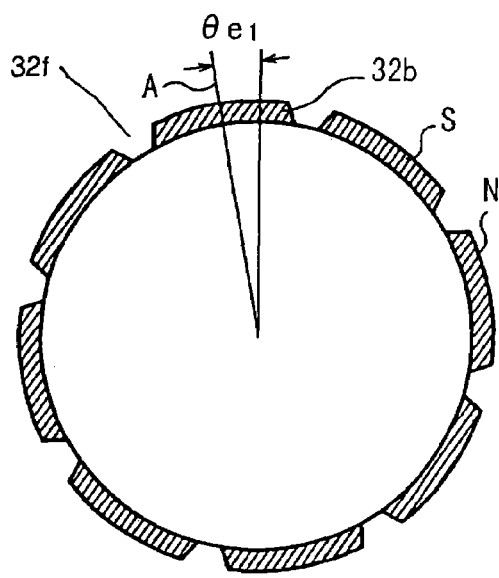
Figure 16C:
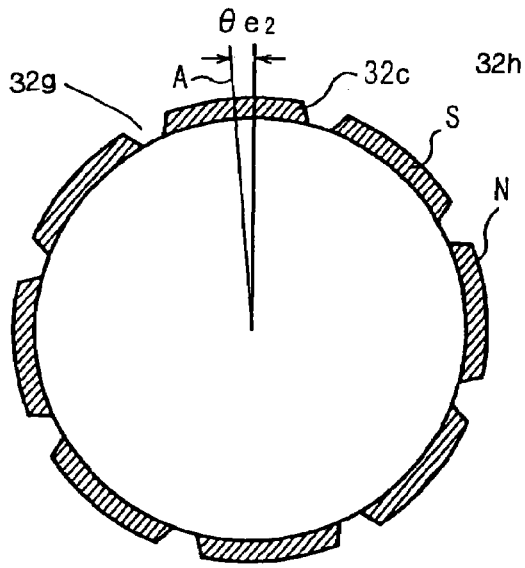
Figure 16D:
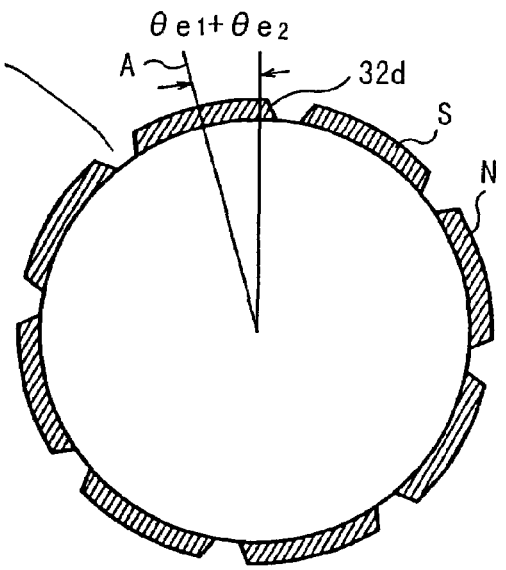

As illustrated in FIGS. 16A, 16B and 16C, the permanent magnets 32b in the second row are offset by a row-to-row skew angle (electrical angle) $\theta e1$ in the circumferential direction from the permanent magnets 32a in the first row, as are the permanent magnets 32d in the fourth row from the permanent magnets 32c in the third row. Also, the permanent magnets 32c, 32d in the lower two rows are offset by a row-to-row skew angle (electrical angle) $\theta e2$ in the circumferential direction from the permanent magnets 32a, 32b in the upper two rows.

The row-to-row skew angle $\theta e1$ is set within a range between a theoretical angle $\theta s$ calculated by the equation (180 times the number of rotor poles/the least common multiple of the number of stator poles and the number of rotor poles)/(the number of permanent magnet rows along the axial direction) and approximately 1.7 times the theoretical angle $\theta s$ thus calculated, where the number of permanent magnet rows along the axial direction is 2 since the cogging torque is reduced individually by the upper two magnet rows and the lower two magnet rows in this embodiment. The row-to-row skew angle $\theta e2$ is set at one-half times the theoretical angle $\theta s$.

Figure 17:
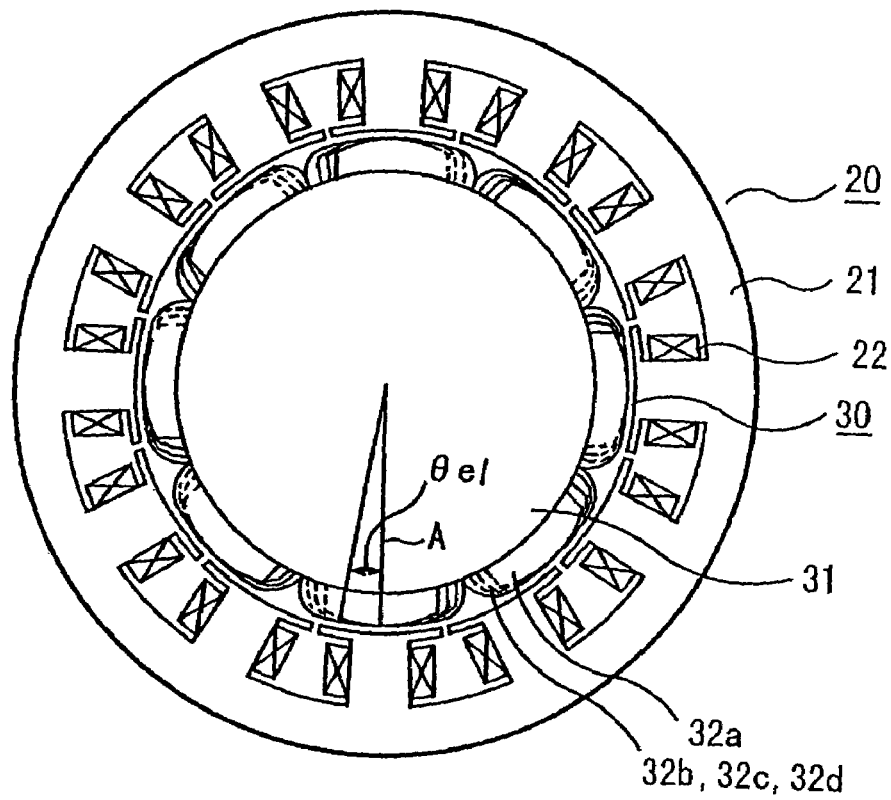
FIG. 17 is a sectional plan view of the permanent-magnet rotating machine of the fourth embodiment.

Referring to FIG. 17, a stator 20 includes a cylindrical stator core 21 and a plurality of stator coils 22 which are arranged on a curved inner surface of the stator core 21 to form multiple magnetic poles. The rotor core 31 of the rotor 30 is mounted inside the stator 20 so that the rotor 30 can rotate about a central axis of the stator 20. Electric currents are caused to flow through the stator coils 22 in a controlled fashion to create a rotating magnetic field so that the rotor 30 rotates about its rotary shaft which is aligned with the central axis of the stator 20.

In the aforementioned arrangement of FIGS. 15, 16A, 16B, 16C, 16D and 17, the number of rotor poles is 8, the number of stator poles is 12 and the number of permanent magnet rows is 2 (two each in the upper and lower rows), so that the row-to-row skew angle θe1 is set within a range from 30 degrees (theoretical angle θs) to approximately 52 degrees (approximately 1.7 times the theoretical angle θs). Also, the row-to-row skew angle θe2 is set at 15 degrees (one-half times the theoretical angle θs).

It is possible to reduce the fundamental component of the cogging torque (6f component) as well as torque ripples more effectively by making the row-to-row skew angle θe1 larger than the theoretical angle θs but not larger than approximately 1.7 times the theoretical angle θs, as compared to a case where the row-to-row skew angle θe1 is set at the theoretical angle θs.

Also, the second harmonic component of the cogging torque can be reduced by setting the row-to-row skew angle θe2 at one-half times the theoretical angle θs.

The discussion below will illustrate the relationship of the cogging torque and torque ripple versus the row-to-row skew angles θe1, θe2 and show that the cogging torque and torque ripple can be reduced by the arrangement of the present embodiment.

The foregoing discussion of the first embodiment illustrated the results of the three-dimensional magnetic field analysis carried out on a two-magnet-row structure, which is equivalent to the structure of each of the upper two magnet rows and the lower two magnet rows of the fourth embodiment, with reference to the rotor 30 and the permanent-magnet rotating machine (in which the number of rotor poles is 8, the number of stator poles is 12 and the number of permanent magnet rows is 2). The row-to-row skew angle θe2 is not affected by the effect of magnetic saturation, so that it should be set at one and one-half times the theoretical angle θs. The row-to-row skew angle θe1, however, is affected by the effect of magnetic saturation, and because the rotor 30 of this embodiment employs a four-magnet-row structure, the extent of the influence of magnetic saturation might be different from that in the first embodiment.

Figure 18:
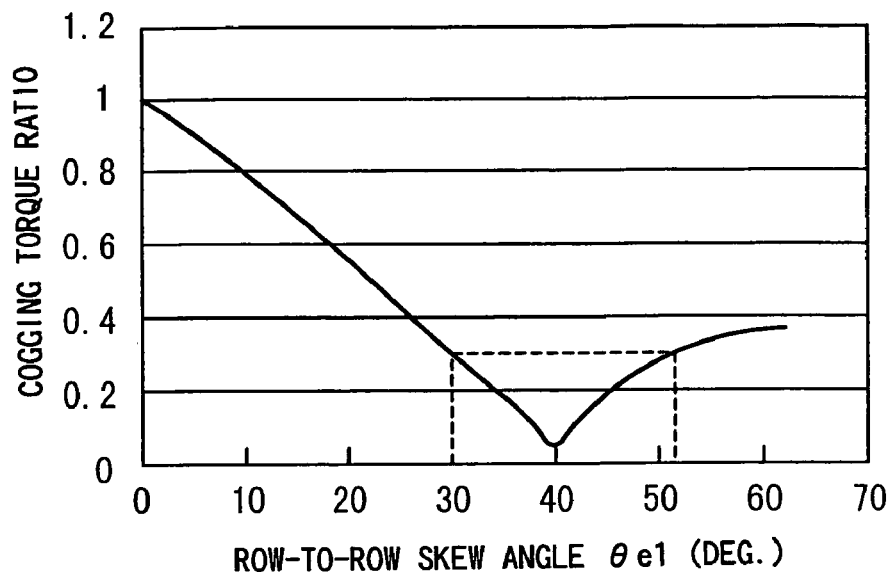
FIG. 18 is a chart showing measurement results on the permanent-magnet rotating machine of the fourth embodiment.

FIG. 18 is a chart showing measurement results of the fundamental component of the cogging torque obtained on an actual rotating machine of the fourth embodiment having the four-magnet-row structure including the upper two magnet rows and the lower two magnet rows when the row-to-row skew angle θe1 is varied. Specifically, the chart show the relationship between the cogging torque ratio, which is the ratio of the cogging torque occurring in the absence of skew (θe1=0) to the cogging torque occurring when the permanent magnets 32a, 32b, 32c, 32d are skewed (θe1≠0), and the row-to-row skew angle θe1. The number of rotor poles was 8 and the number of stator poles was 12 in the actual rotating machine used for measurement.

It is seen from FIG. 18 that the cogging torque ratio is 0.28 when the row-to-row skew angle θe1 is set at the electrical angle of 30 degrees. Thus, in order to make the cogging torque ratio equal to or smaller than 0.28, the row-to-row skew angle θe1 should be set at an angle larger than 30 degrees but not larger than approximately 52 degrees (approximately 1.7 times the theoretical angle θs of 30 degrees). To summarize, it is assumed that the row-to-row skew angle θe1 should be made larger than the theoretical angle θs but not larger than approximately 1.7 times the theoretical angle θs.

Also, if it is desired to make the cogging torque ratio equal to about one-half of 0.28, the row-to-row skew angle θe1 should be set at an angle equal to or larger than 36 degrees but not larger than 44 degrees, that is, equal to or larger than approximately 1.2 times the theoretical angle θs but not larger than approximately 1.47 times the theoretical angle θs.

Fifth Embodiment

FIGS. 20, 21A, 21B, 21C and 21D are diagrams showing the construction of a permanent-magnet rotating machine according to a fifth embodiment of the invention.

In the fourth embodiment described above, the permanent magnets 32a, 32b in the upper two rows and the permanent magnets 32c, 32d in the lower two rows are individually skewed by the row-to-row skew angle θe1 to reduce the fundamental component of the cogging torque and the torque ripples, and the permanent magnets 32c, 32d in the lower two rows are offset from the permanent magnets 32a, 32b in the upper two rows by the row-to-row skew angle θe2 to reduce the second harmonic component of the cogging torque.

While employing a four-magnet-row structure similar to that of the fourth embodiment, the fifth embodiment is characterized in that permanent magnets in the upper two rows and those in the lower two rows are individually skewed by the row-to-row skew angle θe2 to reduce the second harmonic component of the cogging torque, and the permanent magnets in the lower two rows are offset from the permanent magnets in the upper two rows by the row-to-row skew angle θe1 to reduce the fundamental component of the cogging torque and the torque ripples.

Figure 19:
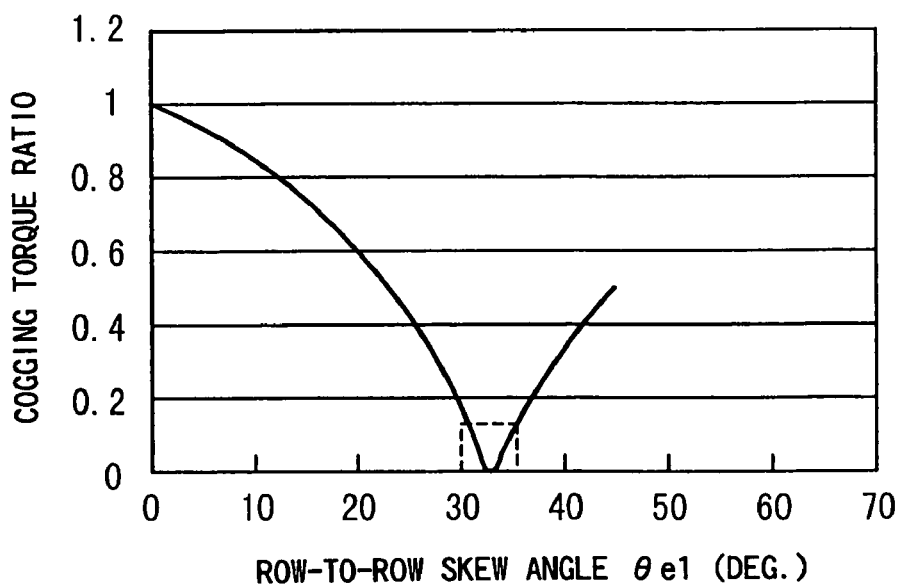
FIG. 19 is a chart showing measurement results on a permanent-magnet rotating machine according to a fifth embodiment of the invention.
Figure 20:
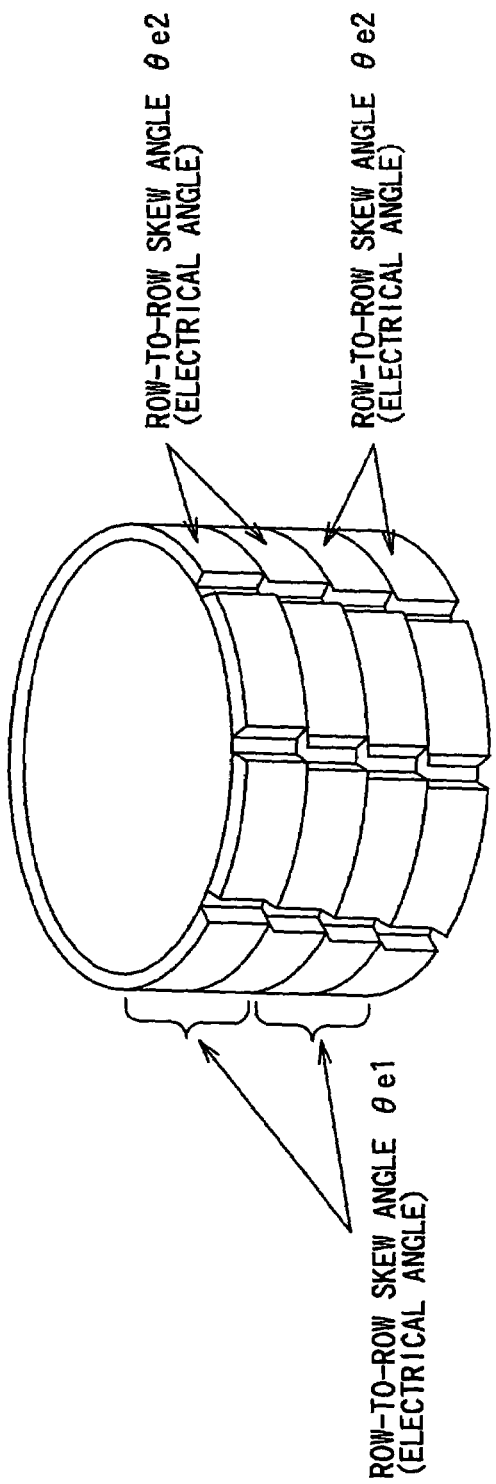
FIG. 20 is a perspective view of a rotor of a permanent-magnet rotating machine according to the fifth embodiment of the invention.
Figure 21A:
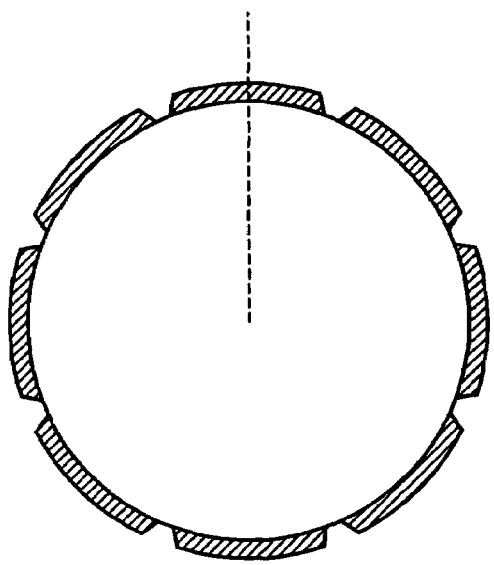
FIGS. 21A, 21B, 21C and 21D are sectional plan views of the rotor of FIG. 20.
Figure 21B:
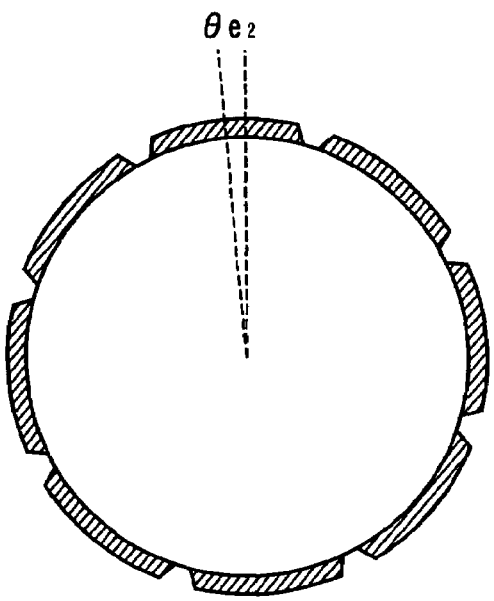
Figure 21C:
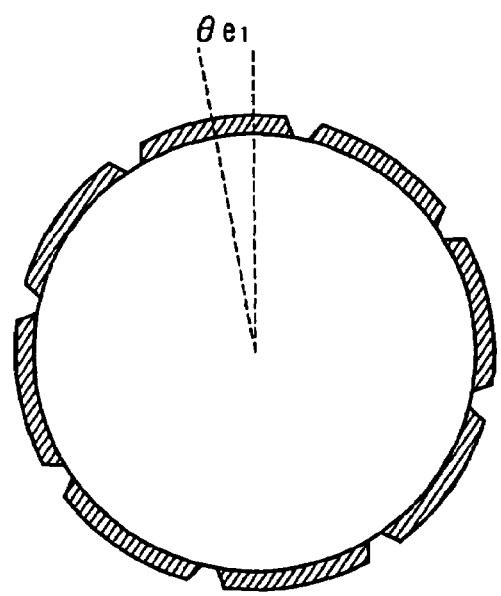
Figure 21D:
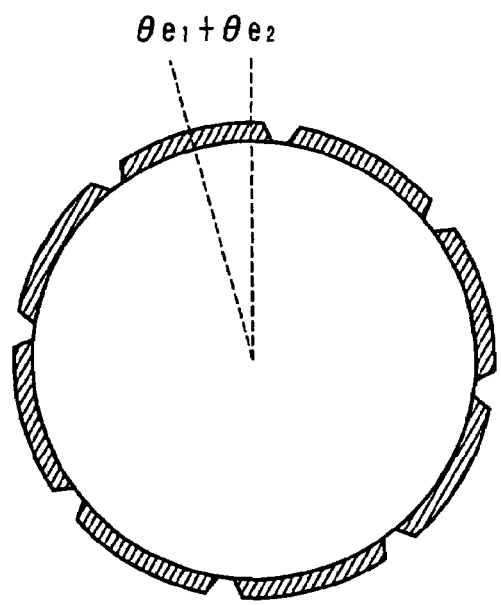

FIG. 19 is a chart showing the relationship between the cogging torque ratio with respect to the fundamental component of the cogging torque and the row-to-row skew angle θe1 based on measurement results obtained on an actual rotating machine of the fifth embodiment when the permanent magnets in the upper two rows and those in the lower two rows are individually skewed by the row-to-row skew angle θe2 and the permanent magnets in the lower two rows are offset from the permanent magnets in the upper two rows by the row-to-row skew angle θe1. The number of rotor poles was 8 and the number of stator poles was 12 in the actual rotating machine used for measurement.

It is seen from FIG. 19 that the cogging torque ratio is 0.15 when the row-to-row skew angle θe1 is set at the electrical angle of 30 degrees. Thus, in order to make the cogging torque ratio equal to or smaller than 0.15, the row-to-row skew angle θe1 should be set at an angle larger than 30 degrees but not larger than approximately 35 degrees (approximately 1.2 times the theoretical angle θs of 30 degrees). To summarize, it is assumed that the row-to-row skew angle θe1 should be made larger than the theoretical angle θs but not larger than approximately 1.2 times the theoretical angle θs.

What is claimed is:

1. A permanent-magnet rotating machine comprising:
 a rotor having a rotor core carrying on a curved outer surface multiple permanent magnets which are arranged in two rows along an axial direction so that the permanent magnets in one row are skewed from the permanent magnets in the other row in a circumferential direction, by a row-to-row skew angle θe, expressed in terms of electrical angle; and a stator having a tubular stator core in which the rotor is disposed, the stator core including stator coils for producing a rotating magnetic field which causes the rotor to rotate, wherein the stator core has a relationship between flux density and magnetizing force that is deteriorated due to a manufacturing process as compared to the relationship between flux density and magnetizing force that is unaffected by manufacturing processes, leakage flux occurs inside the stator core along an axial direction due to the row-to-row skew of the rows of magnets, a lower limit of the row-to-row skew angle θe is larger than a theoretical angle θs, expressed in terms of electrical angle by (180 times the number of rotor poles /the smallest number of which the number of stator poles and the number of rotor poles are factors)/(number of permanent magnet rows along the axial direction), a cogging torque ratio, which is the ratio of cogging torque occurring without skew to the cogging torque occurring when the permanent magnets are skewed, at the theoretical angle θs is calculated based on a relationship between the cogging torque ratio and the row-to-row skew angle θe and the relationship between flux density and magnetizing force of the stator core that is deteriorated due to a manufacturing process, and an upper limit of the row-to-row skew angle θe is no larger than a maximum value of the row-to-row skew angle θe at which the cogging torque ratio does not exceed the calculated cogging torque ratio at the theoretical angle θs.

2. The permanent-magnet rotating machine according to claim 1, wherein the ratio of number of rotor poles to number of stator poles is 2:3, the lower limit of the row-to-row skew angle θe is larger than the theoretical angle θs of 30 degrees, and the upper limit of the row-to-row skew angle θe is set at 43 degrees.

3. The permanent-magnet rotating machine according to claim 2, wherein the stator core is divided into upper, middle, and lower blocks and the upper and lower blocks are offset in the same direction with respect to the middle block to set the row-to-row skew angle e at 15 degrees in terms of electrical angle.

4. The permanent-magnet rotating machine according to claim 2, wherein, in each row of the permanent magnets, two permanent magnets forming one pair of north and south poles are offset from equiangular points by 15 degrees so that they are located closer to each other and two permanent magnets forming an adjacent pair of north and south poles are offset from equiangular points by 15 degrees so that they are located farther away from each other.

5. The permanent-magnet rotating machine according to claim 1, wherein, in each row of the permanent magnets, two permanent magnets forming one pair of north and south poles are offset from equiangular points by one-half the theoretical angle θs so that they are located closer to each other and two permanent magnets forming an adjacent pair of north and south poles are offset from equiangular points by one-half the theoretical angle θs so that they are located farther away from each other.

6. The permanent-magnet rotating machine according to claim 1, wherein the stator core is divided into upper, middle, and lower blocks and the upper and lower blocks are offset in the same direction with respect to the middle block to set the row-to-row skew angle θe at one-half the theoretical angle θs in terms of electrical angle.

7. A permanent-magnet rotating machine comprising:

a rotor having a rotor core carrying on a curved outer surface multiple permanent magnets which are arranged in four rows along an axial direction so that the permanent magnets in one of two upper rows are skewed from the permanent magnets in the other of the two upper rows in a circumferential direction by a row-to-row skew angle θe1, expressed in terms of electrical angle, the permanent magnets in one of two lower rows of the permanent magnets are skewed from the permanent magnets in the other of the two lower rows by the row-to-row skew angle θe1, expressed in terms of electrical angle, and the permanent magnets in the lower two rows are skewed from the permanent magnets in the upper two rows in the circumferential direction by a row-to-row skew angle θe2, expressed in terms of electrical angle; and a stator having a tubular stator core in which said rotor is disposed, the stator core including stator coils for producing a rotating magnetic field which causes the rotor to rotate, wherein a lower limit of the row-to-row skew angle θe1 is larger than a theoretical angle θs expressed in terms of electrical angle by (180 times the number of rotor poles/the smallest number of which the number of stator poles and the number of rotor poles are factors)/(number of permanent magnet rows along the axial direction).

a cogging torque ratio, which is the ratio of cogging torque occurring without skew to the cogging torque occurring when the permanent magnets are skewed, at the theoretical angle θs is calculated based on a relationship between the cogging torque ratio and the row-to-row skew angle θe1 and the relationship between flux density and magnetizing force of the stator core, and an upper limit of the row-to-row skew angle θ1e is no larger than a maximum value of the row-to-row skew angle θe1 at which the cogging torque ratio does not exceed the calculated cogging torque ratio at the theoretical angle θs.

8. A permanent-magnet rotating machine comprising:

a rotor having a rotor core carrying on a curved outer surface multiple permanent magnets which are arranged in four rows along an axial direction so that the permanent magnets in one of two upper rows are skewed from the permanent magnets in the other of the two upper rows in a circumferential direction by a row-to-row skew angle θe2, expressed in terms of electrical angle, the permanent magnets in one of two lower rows are skewed from the permanent magnets in the other of the two lower rows by the row-to-row skew angle θe2, expressed in terms of electrical angle, and the permanent magnets in the lower two rows are skewed from the permanent magnets in the upper two rows in the circumferential direction by a row-to-row skew angle θe1, expressed in terms of electrical angle; and a stator having a tubular stator core in which said rotor is disposed, the stator core including stator coils for producing a rotating magnetic field which causes the rotor to rotate, wherein a lower limit of the row-to-row skew angle θe1 is larger than a theoretical angle θs expressed in terms of electrical angle by (180 times the number of rotor poles/the smallest number of which the number of stator poles and the number of rotor poles are factors)/(number of permanent magnet rows along the axial direction), a cogging torque ratio, which is the ratio of cogging torque occurring without skew to the cogging torque occurring when the permanent magnets are skewed, at the theoretical angle θs is calculated based on a relationship between the cogging torque ratio and the row-to-row skew angle θe1 and the relationship between flux density and magnetizing force of the stator core, and an upper limit of the row-to-row skew angle θ1e is no larger than a maximum value of the row-to-row skew angle θe1 at which the cogging torque ratio does not exceed the calculated cogging torque ratio at the theoretical angle θs.

9. The permanent-magnet rotating machine according to claim 7, wherein the row-to-row skew angle θe2 is one-half the theoretical angle θs.

10. The permanent-magnet rotating machine according to claim 8, wherein the row-to-row skew angle θe2 is one-half the theoretical angle θs.

* * * * *